United States Patent
Lloyd et al.

(10) Patent No.: US 10,052,716 B2
(45) Date of Patent: Aug. 21, 2018

(54) MANUFACTURE OF A DRUM FOR A GAS TURBINE ENGINE

(71) Applicant: ROLLS-ROYCE plc, London (GB)

(72) Inventors: James R Lloyd, Derby (GB); Oliver Jones, Nottingham (GB); Jamie Sismey, Derby (GB); Luke Freeman, South Normanton (GB)

(73) Assignee: ROLLS-ROYCE PLC, London (GB)

( * ) Notice: Subject to any disclaimer, the term of this patent is extended or adjusted under 35 U.S.C. 154(b) by 37 days.

(21) Appl. No.: 15/410,531

(22) Filed: Jan. 19, 2017

(65) Prior Publication Data

US 2017/0320159 A1   Nov. 9, 2017

(30) Foreign Application Priority Data

Feb. 16, 2016 (GB) .................................. 1602685.8

(51) Int. Cl.
| | |
|---|---|
| B23K 20/12 | (2006.01) |
| B23P 15/00 | (2006.01) |
| F01D 5/02 | (2006.01) |
| F01D 5/06 | (2006.01) |
| B23K 20/00 | (2006.01) |

(52) U.S. Cl.
CPC .......... *B23K 20/129* (2013.01); *B23P 15/006* (2013.01); *F01D 5/028* (2013.01); *F01D 5/063* (2013.01); *B23K 20/002* (2013.01); *F05D 2230/239* (2013.01); *F05D 2240/80* (2013.01)

(58) Field of Classification Search
CPC ................ B23K 20/129; B23K 20/002; B23K 20/12–20/1215; B23K 2201/001; F01D 5/028; F01D 5/063; B23P 15/006; F05D 2240/80; F05D 2230/239
USPC ............................ 228/112.1–114.5, 2.1–2.3; 29/889.1–889.722
See application file for complete search history.

(56) References Cited

U.S. PATENT DOCUMENTS

| | | | |
|---|---|---|---|
| 4,017,212 A | 4/1977 | Gordienne et al. | |
| 4,483,054 A | 11/1984 | Ledwith | |
| 5,188,279 A | 2/1993 | Joyce et al. | |
| 6,139,412 A * | 10/2000 | Dwyer | B23Q 3/063 269/296 |
| 6,186,867 B1 * | 2/2001 | Dwyer | B23Q 3/063 269/296 |

(Continued)

FOREIGN PATENT DOCUMENTS

| | | |
|---|---|---|
| CN | 202 833 300 U | 3/2013 |
| DE | 10 2006 033298 A1 | 1/2008 |

(Continued)

OTHER PUBLICATIONS

Jun. 22, 2016 Search Report issued in British Patent Application No. 1602685.8.

(Continued)

*Primary Examiner* — Kiley Stoner
(74) *Attorney, Agent, or Firm* — Oliff PLC

(57) ABSTRACT

A method for the manufacture of a blisk drum is described. Disc forging for inertia welding together are provided with sacrificial material whose shape and position is selectively provided such that, on completion of the inertia welding process, integral blades can be fashioned from the sacrificial material. Other components such as buckets and balancing lands may also be provided from the sacrificial material.

13 Claims, 9 Drawing Sheets

(56) References Cited

U.S. PATENT DOCUMENTS

| | | | |
|---|---|---|---|
| 2009/0235526 A1 | 9/2009 | Secherling et al. | |
| 2010/0172761 A1* | 7/2010 | Le Goff | B23K 15/0053 |
| | | | 416/198 A |
| 2012/0134845 A1* | 5/2012 | Khanin | F01D 5/187 |
| | | | 416/97 R |
| 2013/0045088 A1* | 2/2013 | Baumann | F01D 5/141 |
| | | | 415/173.6 |
| 2013/0045091 A1* | 2/2013 | Della-Fera | F01D 11/122 |
| | | | 415/174.4 |
| 2013/0133194 A1 | 5/2013 | Belmonte et al. | |
| 2015/0267540 A1* | 9/2015 | Grilli | B23H 7/02 |
| | | | 416/232 |
| 2016/0146024 A1* | 5/2016 | Morris | F01D 5/3061 |
| | | | 416/96 R |
| 2016/0177971 A1* | 6/2016 | Bagnall | F01D 11/122 |
| | | | 415/173.4 |
| 2017/0022827 A1* | 1/2017 | Waldman | F01D 5/3061 |
| 2017/0058916 A1* | 3/2017 | Whitehurst | F04D 29/667 |

FOREIGN PATENT DOCUMENTS

| | | | | |
|---|---|---|---|---|
| DE | 10 2011 102251 A1 | 11/2012 | | |
| EP | 0 648 938 A1 | 4/1995 | | |
| EP | 1 048 389 A2 | 11/2000 | | |
| EP | 2865482 A1 * | 4/2015 | | B22C 9/04 |
| FR | 2809764 A1 * | 12/2001 | | F01D 1/141 |
| WO | WO 2015085078 A1 * | 6/2015 | | F01D 5/16 |
| WO | 2015/110746 A1 | 7/2015 | | |

OTHER PUBLICATIONS

Jun. 9, 2017 Search Report issued in European Patent Application No. 17 15 2087.

* cited by examiner

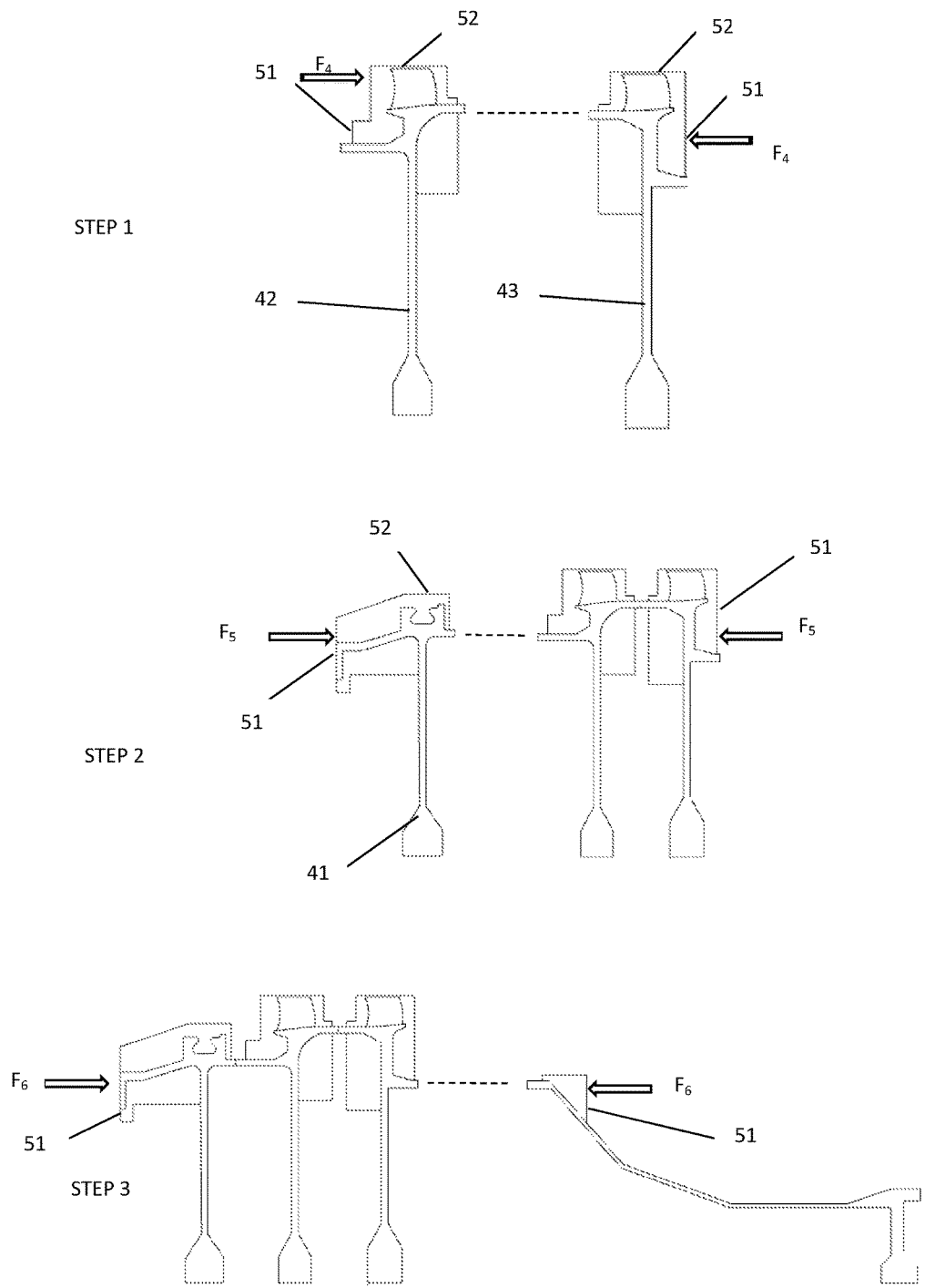

MANUFACTURE OF A DRUM FOR A GAS TURBINE ENGINE

TECHNICAL FIELD OF THE INVENTION

The present disclosure concerns a method for the manufacture of a drum for a gas turbine engine. More particularly the invention comprises a method for manufacturing a drum made from discs which have integrally formed blades (or "blisks").

BACKGROUND TO THE INVENTION

With reference to FIG. 1, a gas turbine engine of known configuration is generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 10 and defines the intake 12.

The gas turbine engine 10 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by suitable interconnecting shaft.

As can be seen, stages of the compressor 14 are consolidated in axial alignment to form a single drum.

There are two presently known methods for joining the compressor stages to form a drum. In a first, discs are welded together using known inertia welding methods (also commonly known as spin welding or rotary friction welding). In a subsequent process, circumferential arrays of removable blades are then fastened to the welded discs. The process is relatively low cost, quick and useful in joining non-similar materials. Since there is no melting of the weld surfaces, the microstructure of the welded component is less affected than with some other known welding processes.

FIG. 2 illustrates a drum manufactured using such a process. As can be seen the finished drum comprises a plurality of discs 23, 24, 25, each carrying a circumferential array of buckets 23a, 24a, 25a. Axially extending circumferential rims of each disc 23, 24, 25 are welded together at welds $W_1$, $W_2$, $W_3$. As is known, to perform an inertia weld, it is necessary for the work pieces to be forged together after or during friction is applied to the weld surfaces by rubbing the surfaces together. For this to be done, sacrificial material 23b, 24b, 25b is provided in the region of the circumferential rims which can be used to hold the components in the inertia welding equipment during the process. This sacrificial material also assists in balancing forces experienced by the components during welding to ensure a weld of satisfactory quality. After completion of the welding operation, the sacrificial material is removed in a post process machining operation. Such subsequent machining operations typically result in scrappage of the removed material.

As can be seen in FIGS. 3 and 4, during the inertia welding process opposing axial forces are applied to axially facing surfaces of the sacrificial materials 23b, 24b, 25b, 26b of the discs 23, 24, 25 and spline 26. Opposing forces $F_3$ are applied to load balancing portions of sacrificial material 23b and 24b to provide weld $W_1$, opposing forces $F_2$ are applied to load balancing portions of sacrificial material 24b and 25b to provide weld $W_2$ and opposing forces $F_1$ are applied to load balancing portions of sacrificial material 25b and 26b to provide weld $W_3$. As can be seen paired surfaces to which the forces are applied are axial facing and have a significant overlap in a radial direction adjacent the weld surfaces to facilitate good alignment of the weld. As can be seen the radial heights of the welds vary so as to allow access to apply the required paired axial forces $F_1$, $F_2$, $F_3$. During the process, the disks can be clamped by radially outward protruding portions of the sacrificial materials 23b, 24b, 25b, 26b.

FIG. 4 shows the inertia welded product of the forging of FIG. 3 after the sacrificial material has been removed to provide a drum having buckets 23a, 24a, 25a into which blades can be secured.

It is known that electron beam welding can be used to join thin pieces of material. Unlike in inertial welding, there are no significant frictional or forging forces to overcome. The electron beam can be accurately targeted to the closely positioned weld surfaces to create a weld pool and subsequent fusion of the materials. The process does not require sacrificial material for the attachment of welding equipment and to balance forces in the weld zone during the process. However, since the process involves local melting it can be deleterious to the microstructure of the weld material for some high temperature materials. Furthermore, the process is not well suited to joining dissimilar materials and is not suited to the welding of all high temperature materials.

In a second known method, a plurality of blisks is preformed and in a subsequent step the blisks are welded together using electron beam welding (EBW). FIGS. 5 and 6 illustrate a drum manufactured using such a process. As can be seen in FIG. 5, near net shape forging 31, 32, 33 are provided and in a first step are cut down to form the 31a, 32a, 33a. In a subsequent step, the blisks 31, 32, 33 are welded together at welds $W_4$ and $W_5$ as shown in FIG. 6. As can be seen there is little variation in the radial height of the welds. Since EBW is a fusion welding method, there is no requirement for the opposing axial forces $F_1$, $F_2$, $F_3$ that are needed in an inertial welding process. It will be appreciated that the near net shape forging and finished blisks used in the known EBW process are not well suited to quality inertia friction welding.

There is a need for a cost efficient, widely applicable method for manufacturing a drum, more particularly which is suited to the manufacture of a blisk drum for use in a gas turbine engine.

SUMMARY OF THE INVENTION

The present invention provides a method for the manufacture of a blisk drum for use in a gas turbine engine, the method comprising, in sequence;

providing a plurality of disc forging, at least one of which is proportioned to enable a blisk to be cut from the forging and each including sacrificial material;

arranging two disc forging in axial alignment for welding in an inertia welding machine;

performing inertia welding to provide a joined disc forging;

arranging any subsequent disc forging sequentially in axial alignment with the joined disc forging and performing inertia welding to provide a disc forging drum;

fashioning at least some of the sacrificial material into blades whereby to form a blisk drum;

wherein the sacrificial material on a disc forging is configured to provide at least one planar force balancing surface to which an axial force can be applied during inertia welding and at least one holding surface which can be fixed in position with respect to an inertia welding machine used to perform the inertia welding.

Hitherto, blisk drums have been provided by EBW welding, some limitations and disadvantages of which have been discussed. In prior art arrangements using inertia welding, sacrificial material is shaped and positioned primarily to provide a suitable force reaction at the weld interface and is removed to fashion buckets for the mechanically fixing blades. According to the invention, the required force reactions can still be provided but a proportion of the material (which in prior art arrangements might be scrapped) can serve a purpose post welding when the sacrificial material is machined to form integral blades. Consequently, less material is scrapped and the need for subsequent manufacturing steps to separately join blades or cut buckets and mechanically attach blades is removed. Furthermore, the process results in blisks which, compared to discs with mechanically attached blades, are lighter and have less sub-components reducing risk of sub-component failure and the need for repair or maintenance. Blisks are known to improve compression efficiency in an engine and are expected to provide a consequential benefit of improved specific fuel burn in the combustor of the engine.

In some embodiments, the forging are composed from a nickel base alloy. The invention is, however, equally applicable to components formed from other high performance alloys known to be used in the manufacture of gas turbine engines, for example (but without limitation), iron based alloys, cobalt based alloys and titanium, based alloys. The blisk drum may form multiple stages of a compressor of a gas turbine engine. In other embodiments, the blisk drum may form multiple stages of a turbine of a gas turbine engine. For example, the blisk drum comprises three blisk stages, though in other options it may comprise two blisk stages or greater than three blisk stages. The blisk drum may include one or more stages which is not a blisk, that is, one or more of the stages may be machined post welding to provide buckets for the mechanical fixing of blades.

Optionally, sacrificial material may also be selectively shaped and positioned to allow additional features of the blisk drum to be machined from the sacrificial material. For example, balance lands may be provided by selective removal of this sacrificial material.

It will be appreciated that additional preparation steps may be performed to prepare the disc forging for welding. For example, features radially inward of the weld line may be machined from the disc forging prior to the welding step. In another example, a weld surface may be prepared by machining to consistent size/shape or smoothing to avoid the inclusion of pores or other anomalies in the weld.

On completion of the welding step, a weld clean-up step may be performed prior to removal of the sacrificial material. In one option, outer diameter features of the drum are machined in a step separate from the selective removal of sacrificial material to form the integral blades.

The step of removal of the sacrificial material may include one or more of milling and turning. For example, the outer diameter features may be turned and separately, the blades may be milled out of the sacrificial material. Milling of the blades may involve a first rough milling step and a second finish milling step. A milling operation may also be used to machine out detailed features of the blisk drum and/or balance lands. Blades may be polished as a final finishing operation.

Once finished, the blisk drum is arranged for rotation in a gas turbine engine and is balanced for consistently centered rotation by the adjustment of one or more balance lands provided on the blisk drum.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

An embodiment of the invention will now be described by way of example only, with reference to the Figures, in which.

DETAILED DESCRIPTION OF DRAWINGS AND EMBODIMENTS

FIGS. 1 to 6 are described above.

Figure 7:
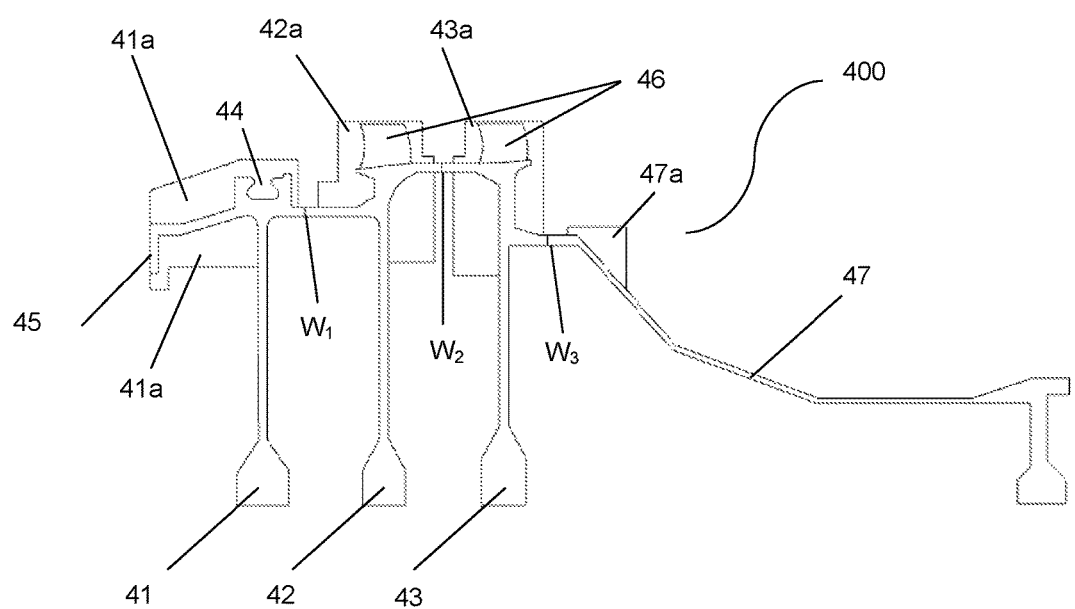
FIG. 7 is a sectional side view of one half of a blisk drum manufactured in accordance with an embodiment of the invention.

The blisk drum of FIG. 7 is representative of a blisk drum partway through a method in accordance with the invention. The figure shows three disc forging 41, 42, 43 welded at weld interfaces $W_1$, $W_2$, $W_3$ The forging carry sacrificial material in substantially similar form to that shown in FIGS. 2 and 3. The forging are inertia welded in the known manner. In a step subsequent to the inertia welding step the sacrificial material is machined to form a blade bucket 44, a balancing land and front flange 45 and integrally formed blades 46. After removal of the sacrificial material, the result is a blisk drum comprising two blisk stages joined at the weld $W_2$ and a third disc joined to the blisk drum at the weld $W_1$. It will be noted that in this example, the third disc is provided with circumferentially arranged buckets 44 into which individual blades can be mechanically fastened according to known methods in a step subsequent to the inertia welding step.

Figure 1:
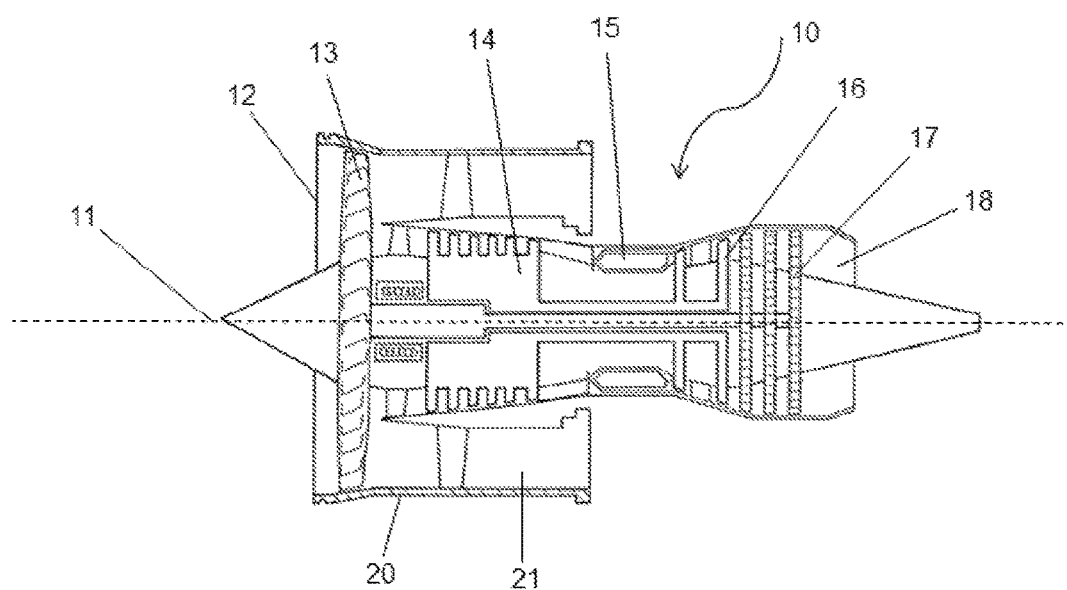
FIG. 1 is a sectional side view of a gas turbine engine.
Figure 2:
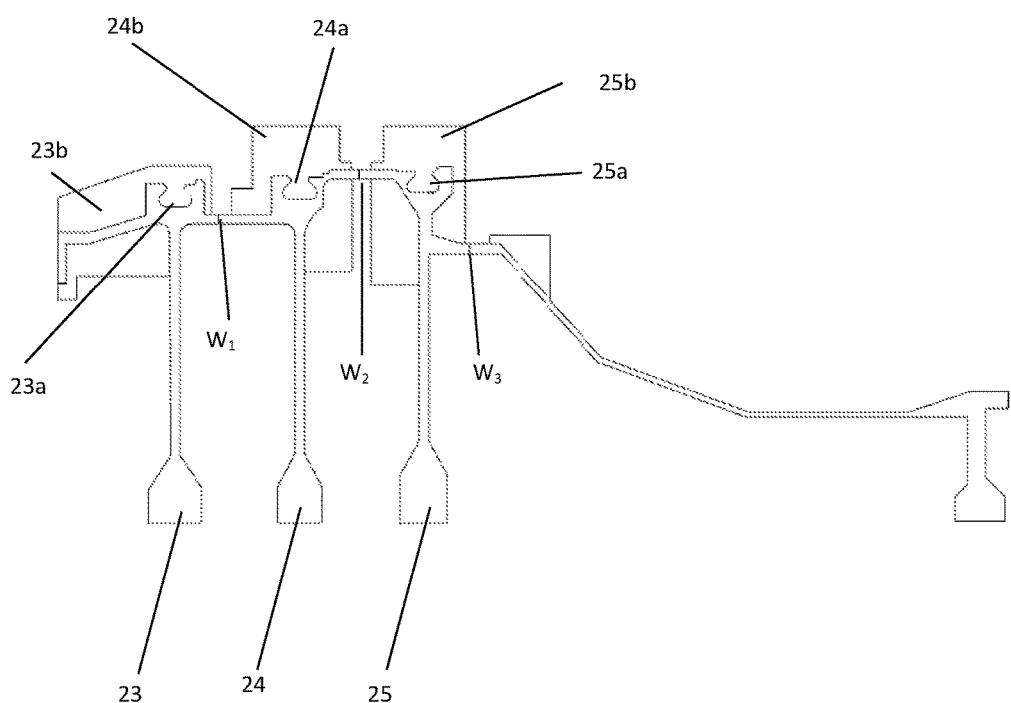
FIG. 2 is a sectional side view of one half of a drum manufactured using a prior known inertia welding method.
Figure 3:
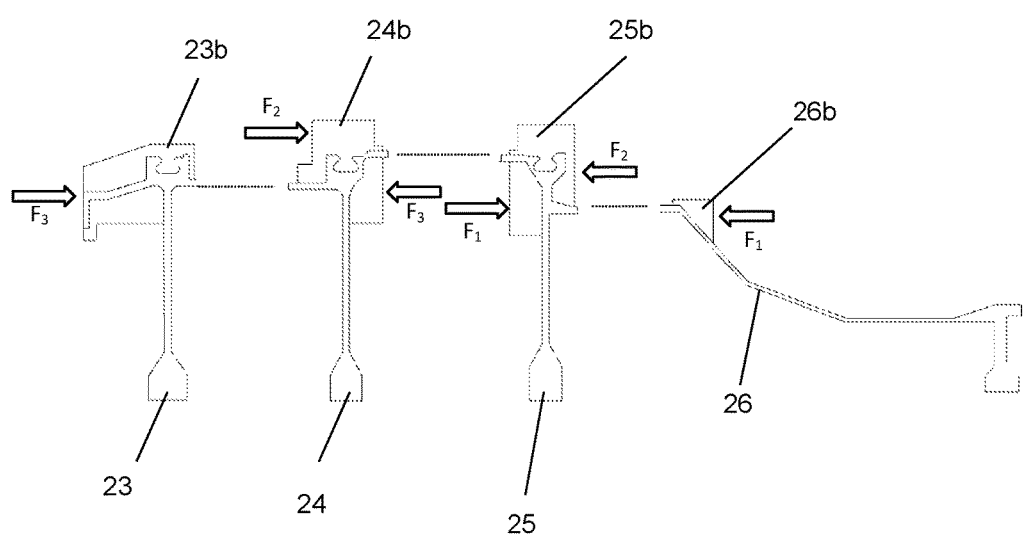
FIG. 3 shows forces applied in inertia welding of component disc forging to provide the drum of FIG. 2.
Figure 4:
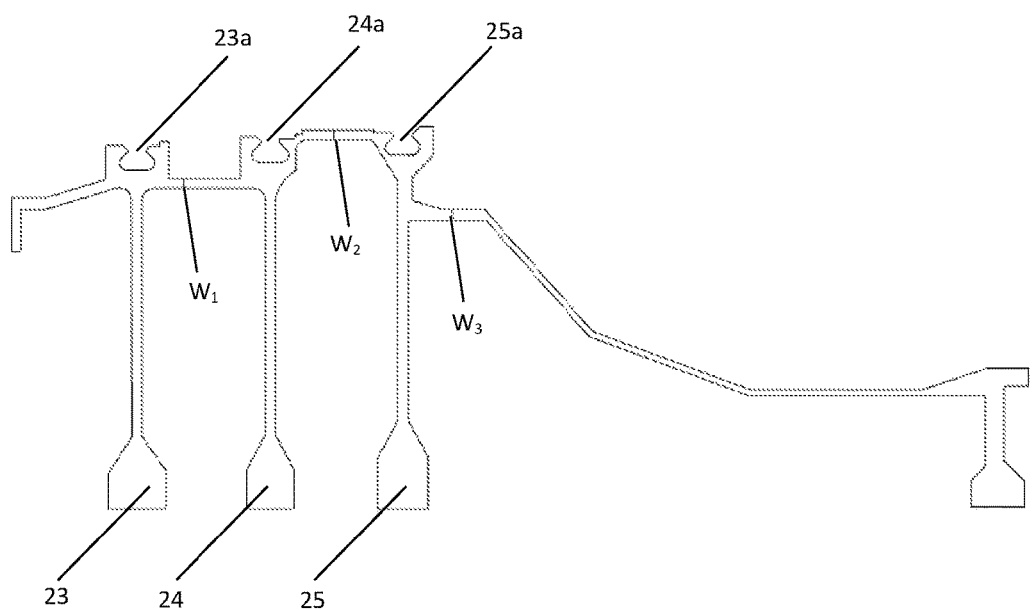
FIG. 4 shows a drum resulting from inertia welding of forging shown in FIGS. 2 and 3.
Figure 5:
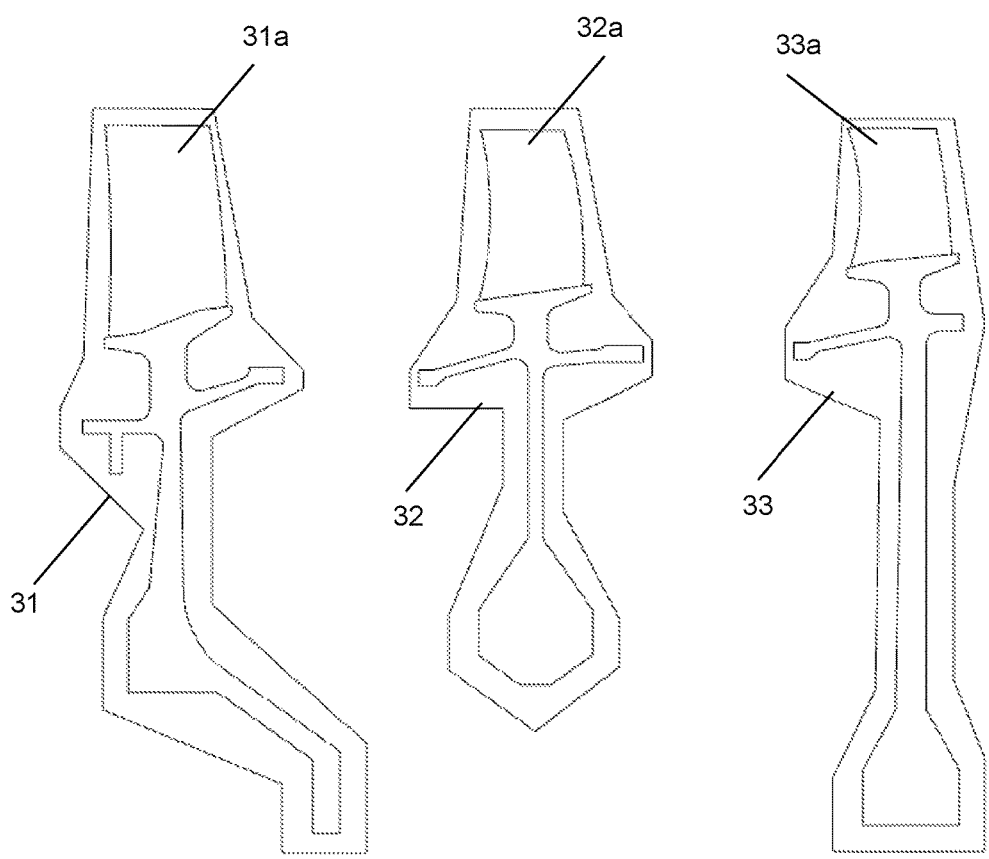
FIG. 5 shows near net shape forging from which blisks are cut for EBW welding in a prior known method for manufacturing a blisk drum.
Figure 6:
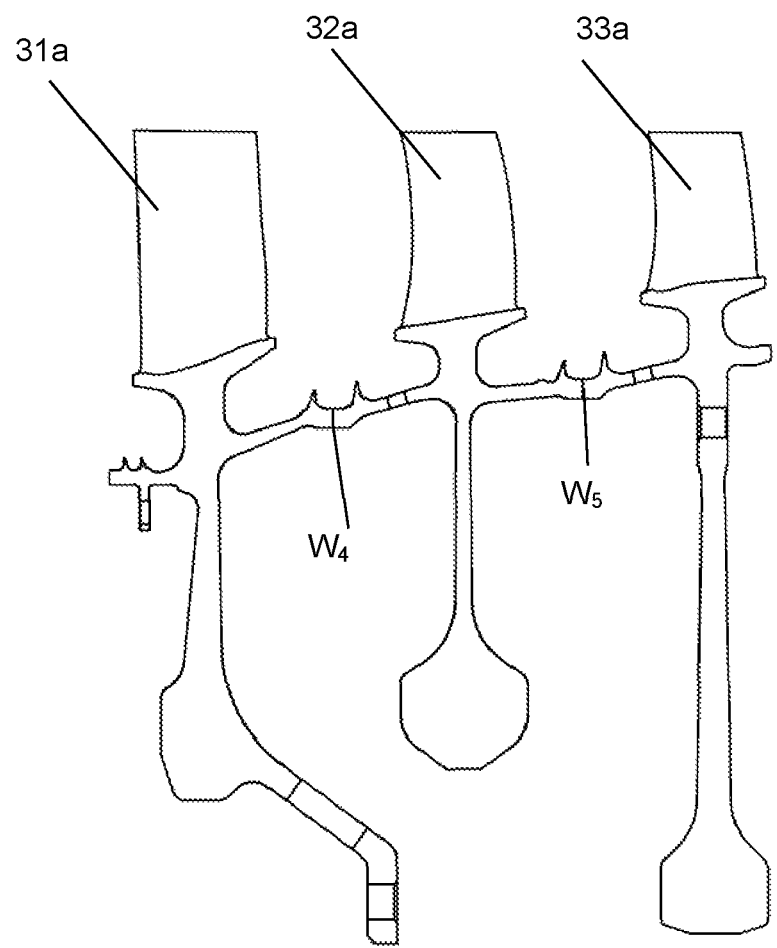
FIG. 6 is a sectional side view of one half of a blisk drum manufactured using a prior known electron beam welding method and the near net shape forging of FIG. 5.

It will be noted that by comparison to the arrangement in FIG. 5, the sacrificial material is repositioned and reshaped to provide force balancing surfaces and clamping surfaces which allow the forging to be welded using an inertia welding rather than an EBW welding method. The radial positioning of the welds are also staggered relative to the FIG. 6 blisk drum so that access can be provided to perform the welding process. The dimensions and arrangement of the sacrificial material can be selected to accommodate the desired blade dimensions for each blisk. The total quantity of material need not be any greater than that used in the prior known method of FIGS. 2 to 4, but substantially less of the sacrificial material is scrapped and the number of subsequent operations to complete the manufacture of the bladed disc drum is reduced.

Figure 8:
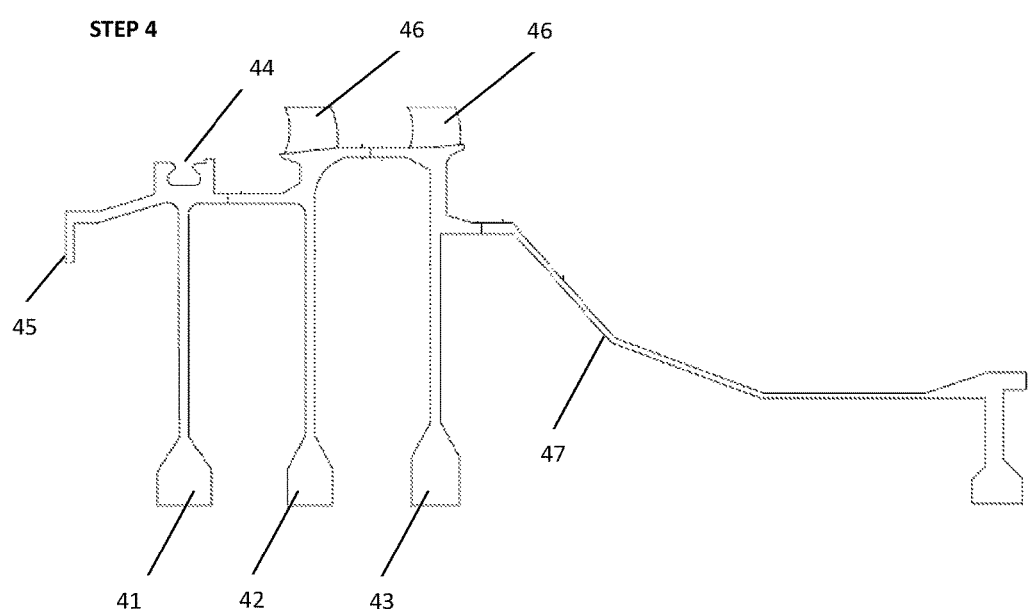
FIG. 8 shows sequential steps of the method of the invention.

As can be seen in FIG. 8, in step 1, disc forging 42 and 43 are inertia welded together. The forging are secured at holding surfaces 52 and opposing forces $F_4$ are applied to oppositely facing force balancing surfaces 51. The product of this welding step is then welded to disc forging 41 in step 2. Again, as part of the welding process opposing axial forces $F_5$ are applied to oppositely facing force balancing surfaces 51. The product of Step 2 may then be welded to a cone 47. Again as part of the welding process, opposing axial forces $F_6$ are applied to oppositely facing force balancing surfaces 51.

It is to be understood that Steps 1 to 3 are presented as an example and the forging may be welded in other sequences. In one alternative, the forging may be welded in the sequence; 41 to 42, 43 to 47 and then 43 to 42. Once a disc forging drum 400 has been produced, sacrificial material can be removed to provide a lighter drum and the integral blades 46, bucket 44 and land 45.

It will be understood that the invention is not limited to the embodiments above-described and various modifications and improvements can be made without departing from the scope of the invention as defined by the appended claims. Except where mutually exclusive, any of the features may be employed separately or in combination with any other features and the disclosure extends to and includes all combinations and sub-combinations of one or more features described herein.

The invention may have application in the manufacture of blisk drums for engines of configurations other than that described herein. By way of example such engines may have an alternative number of interconnecting shafts (e.g. three) and/or an alternative number of compressors and/or turbines. Further the engine may comprise a gearbox provided in the drive train from a turbine to a compressor and/or fan.

The invention claimed is:

1. A method for the manufacture of a blisk drum for use in a gas turbine engine, the method comprising, in sequence;
   providing a plurality of disc forging, at least one of which is proportioned to enable a blisk to be cut from the forging and each including sacrificial material;
   arranging two disc forging in axial alignment for welding in an inertia welding machine;
   performing inertia welding to provide a joined disc forging;
   fashioning at least some of the sacrificial material into blades whereby to form a blisk drum;
   wherein the sacrificial material on a disc forging is configured to provide at least one planar force balancing surface to which an axial force can be applied during inertia welding and at least one holding surface which can be fixed in position with respect to an inertia welding machine used to perform the inertia welding.

2. A method as claimed in claim 1 wherein three or more disc forging are provided and further comprising arranging the third and subsequent disc forging sequentially in axial alignment with the joined disc forging and performing inertia welding to provide a disc forging drum.

3. A method as claimed in claim 2 wherein at least two adjacent disc forging include sacrificial material from which a circumferential array of blades is fashioned.

4. A method as claimed in claim 1 wherein the disc forging comprise one or more of; a nickel based alloy, a titanium based alloy; a cobalt based alloy, an iron based alloy.

5. A method as claimed in claim 1 wherein the blisk drum is configured for use in the compressor of a gas turbine engine.

6. A method as claimed in claim 1 wherein the blisk drum is configured for use in the turbine section of a gas turbine engine.

7. A method as claimed in claim 1 wherein one or more of the disc forging includes sacrificial material from which a balance land can be fashioned after inertial welding.

8. A method as claimed in claim 1 comprising, prior to inertia welding, processing regions of the disc forging which sit radially inwardly of the weld interface.

9. A method as claimed in claim 1 further comprising, after inertia welding, turning the outer diameter surface of the blisk drum and milling the sacrificial material to fashion the integral blades.

10. A method as claimed in claim 9 further comprising polishing the blades after finishing the milling operation.

11. A method as claimed in claim 1 further comprising arranging the blisk drum for axial rotation and balancing the blisk drum by adjustment of balance lands.

12. A method as claimed in claim 11 wherein the balance lands are fashioned from sacrificial material provided on one or more of the disc forging.

13. A method as claimed in claim 1 further comprising providing assembling the blisk drum into a compressor for a gas turbine engine and assembling the compressor with a combustor and a turbine to form a gas turbine engine.

* * * * *